United States Patent [19]

Columbus et al.

[11] Patent Number: 5,039,401

[45] Date of Patent: Aug. 13, 1991

[54] BLOOD COLLECTION AND CENTRIFUGAL SEPARATION DEVICE INCLUDING A VALVE

[75] Inventors: Richard L. Columbus, Rochester; Harvey J. Palmer, Lima, both of N.Y.

[73] Assignee: Eastman Kodak Company, Rochester, N.Y.

[21] Appl. No.: 586,123

[22] Filed: Sep. 21, 1990

Related U.S. Application Data

[63] Continuation-in-part of Ser. No. 524,410, May 16, 1990, abandoned, which is a continuation-in-part of Ser. No. 442,826, Nov. 29, 1989, abandoned.

[51] Int. Cl.[5] .............................................. B01D 21/26

[52] U.S. Cl. .................................... 210/117; 210/136; 210/514; 210/515; 210/782; 137/843; 251/368; 422/101; 436/177; 494/2; 494/16

[58] Field of Search ............... 210/741, 781, 782, 787, 210/789, 117, 130, 136, 514, 515, 516, 518; 422/101, 102; 436/177; 494/2, 16, 20, 21, 37; 137/478, 903, 843, 852; 251/368; 435/2

[56] References Cited

U.S. PATENT DOCUMENTS

| | | | |
|---|---|---|---|
| 3,192,949 | 7/1965 | DeSee | 137/540 |
| 3,661,265 | 5/1972 | Greenspan | 210/359 |
| 3,721,238 | 3/1973 | Wise et al. | 137/478 |
| 3,807,445 | 4/1974 | McPhee | 137/557 |
| 3,849,072 | 11/1974 | Ayres | 137/533.11 |
| 3,935,113 | 1/1976 | Ayres | 210/516 |
| 3,941,699 | 3/1976 | Ayres | 210/516 |
| 3,945,928 | 3/1976 | Ayres | 210/516 |
| 3,998,383 | 12/1976 | Ramanauskas et al. | 233/26 |
| 4,012,325 | 3/1977 | Columbus | 210/516 |
| 4,015,775 | 4/1977 | Rohde | 210/789 |
| 4,202,769 | 5/1980 | Greenspan | 210/516 |
| 4,375,824 | 3/1983 | von Borries et al. | 137/614.17 |
| 4,405,079 | 9/1983 | Schoendorfer | 494/1 |
| 4,443,345 | 4/1984 | Wells | 210/782 |
| 4,487,700 | 12/1984 | Kanter | 210/789 |
| 4,640,785 | 2/1987 | Carroll et al. | 210/782 |
| 4,828,716 | 5/1989 | McEwen et al. | 210/782 |

FOREIGN PATENT DOCUMENTS

| | | |
|---|---|---|
| 2610112 | 1/1987 | France . |
| 237368 | 11/1985 | Japan . |

*Primary Examiner*—W. Gary Jones

*Attorney, Agent, or Firm*—Dana M. Schmidt

[57] ABSTRACT

A device is disclosed that causes phase separation of whole blood, using much lower centrifugal forces. As a result, lymphocytes are separated from blood cells having specific gravities of 1.08 g/ml or higher. The device features a separation chamber arranged so that its long dimension or axis is parallel, not perpendicular, to the spin axis, and a valve that allows automatic removal of the lighter phase(s). The valve is constructed to respond only to the head of liquid pressure generated by an increased centrifugal force, and not to that increased force alone.

14 Claims, 10 Drawing Sheets

FIG. 15
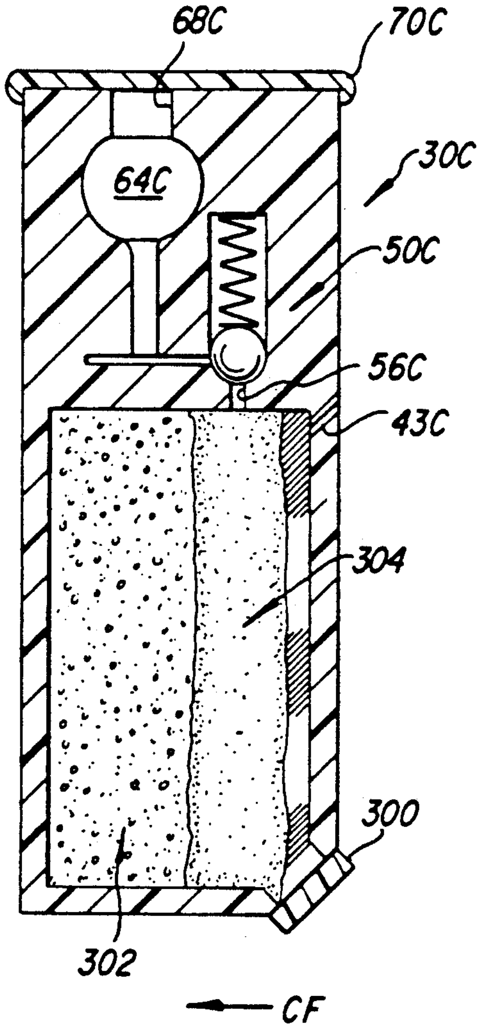
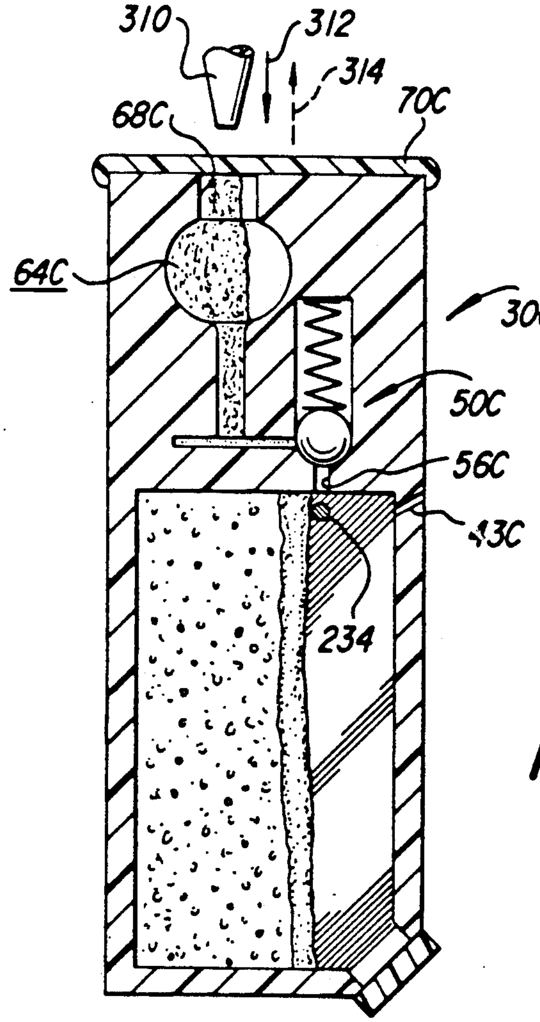
FIG. 16

BLOOD COLLECTION AND CENTRIFUGAL SEPARATION DEVICE INCLUDING A VALVE

RELATED APPLICATIONS

This is a continuation-in-part application of U.S. Ser. No. 524,410 filed on May 16, 1990, now abandoned. U.S. Ser. No. 524,410 in turn is a continuation-in-part application of U.S. Ser. No. 442,826 filed on Nov. 29, 1989, now abandoned.

The method claims that were filed in Ser. No. 442,826 have been refiled as a continuation-in-part application co-filed herewith by Columbus et al.

FIELD OF THE INVENTION

The invention relates to devices for separating a light phase from a heavier phase in a multi-phase liquid, particularly whole blood.

BACKGROUND OF THE INVENTION

Blood collection and separating devices have from time immemorial, spun down the whole blood in a container having its long axis oriented parallel, or mostly parallel, to the direction of the centrifugal force. Examples can be seen in, e.g., U.S. Pat. No. 4,012,325. There are several reasons for this orientation. One reason is that when centrifugal forces cease, there is a substantial distance of separation between the heavier red cells and the lighter serum, and at the same time, an interface between the two phases of reduced surface area. As a result, when serum is drawn off, there is less likelihood that the blood cells will redisperse into the lighter serum phase. To further prevent this undesired event, a gel of intermediate specific gravity is often used, to occupy the surface area between the two phases. The spinning of the container about the long axis insures that the depth of the gel that resists remixing after centrifuging, will be substantial.

Stated from an opposite point of view, it has not been considered feasible to spin such containers about one of the shorter axes. The reason is that the distance between the free surface of the separated serum, and its interface with the separated blood cells, becomes very short, with a concommitant large surface area at said interface. This in turn makes blood cell contamination of the serum as it is "poured off" or removed, more likely. Any attempt to use a gel to shore up such a large surface area interface is less likely to succeed, since the gel will have only a short depth to it to resist remixing. (The volume of the gel will be distributed primarily over that large surface area of the interface.)

However, the conventional approach has paid a price for these conclusions. The price is, that phase separation takes a long time since it has to occur over the longest dimension of the liquid volume. For example, in a blood volume of about 2 mL, using a device similar to that described in the aforesaid '325 patent, the time of separation of the serum from the blood cells is on the order of 5.3 min when spinning at, e.g., 100 g's. It is true, of course, that such separation times are also a function of the centrifugal force applied—the greater the force (e.g., created by higher rpm values), the faster the separation. Thus, typically the forces that are used are well in excess of 1000 g's, as lower forces will cause unacceptable delay in the phase separation. But even at such higher forces, such as 1600 g's, the separation in a 2 mL volume container has not been generally possible in less than 30 sec. Most importantly, however, is a disadvantage that has now been discovered about such centrifugal forces: at the interface between the blood cells and the serum is a layer called the "buffy coat". Among other things, when formed at centrifugal forces in excess of 100 g's, the buffy coat has as an inseparable part thereof, leukocyte cells such as the lymphocyte cells, which contain useful DNA. If those cells could be drawn off, the DNA could be extracted. The problem now is, the phase separation that occurs using conventional containers and centrifuges therefor, insures that those lymphocyte cells are irretrievably mixed with the rest of the buffy coat. It will be readily apparent, therefore, that any attempt to speed up phase separation to less than one minute by drastically boosting the force of spinning, will completely interfere with the retrieval of the lymphocyte cells.

Therefore, prior to this invention there has been a substantial need for a blood phase separation device that can be spun about one of its short axes, to allow faster phase separation and/or lower spinning forces, while at the same time somehow solving the high risk of remixing of the phases, noted above.

One approach to dealing with this need would be, of course, the provision of some mechanism that allows for ready withdrawal of the light serum phase from the container, before the centrifugal force is removed. This in turn will aid in retaining the unwanted blood cells in a capture zone of the container, during serum removal, since the centrifugal force will still be applied. In fact, a blood separator device has been proposed that allows serum removal from the container while spinning still occurs—it even occurs by increasing the spinning speed. The device in question is shown, for example, in Japanese Kokai 60/237368. A valve is provided closing off exit passageway from the container, it being spring biased so that it will open only when the centrifugal force is increased beyond the speed used during phase separation, e.g., from 3000 to 5000 rpm. Clearly, in such a device serum can be drawn off with a minimum of risk of red cells remixing with the serum being drawn. However, even in such a device, it was not considered that the "while—centrifuging" serum withdrawal would permit reorienting the device to spin about its short axis. Instead, the device once again insists on the conventional spin orientation wherein the phase separation must occur over the long axis of the container.

Another disadvantage of the device shown in the Japanese publication is tha* the valve will stay open as long as a high centrifugal force is applied, even in the absence of liquid flow. Clearly, a better construction is one in which the valve automatically closes after all serum is removed. The reasons are that a) failure to do so makes it possible that non-serum components, if somehow loosened in the container, can also get out the valve, and b) the still-open valve prevents other processing from being accomplished while spinning, on the blood cells remaining in the container. This disadvantage stems from the fact that the valve of this prior device operates only in response to centrifugal force, and NOT in response to the presence of liquid, e.g., serum, which is to be drawn off.

There has been a need, therefore, prior to this invention, for a two-phase liquid separation device that will more promptly, and at slower speeds, achieve phase separation and automatic removal of the lighter phase, particularly when processing whole blood.

SUMMARY OF THE INVENTION

We have developed a multi-phase liquid separation device, valve, and method that meet the aforesaid needs. This is achieved by centrifuging the device about one of the short dimensions of the liquid compartment rather than the long one and by a more judicious use of valve means allowing removal of the lighter phase during centrifugation. In its preferred form, the valve means are responsive only to pressure from the lighter phase, and not to the centrifugal force. The result is a dramatic reduction in forces used for phase separation, to levels that allow recovery of cellular fractions heretofore lost, without extending the total time of centrifugation unreasonably.

More specifically, in accord with one aspect of the invention there is provided a liquid phase separation device for phase separation by centrifuging, comprising a chamber with a predetermined volume V, a longest dimension l, and at least one shorter dimension d; the chamber having at least a heavier phase-collecting portion and a lighter phase-collecting portion; means permitting liquid introduction into the chamber; and removing means for removing separated lighter phase out of the chamber after separation without decreasing the centrifugal force used to separate the two-phases. The device is improved in that the heavier phase-collecting portion and the lighter phase-collecting portion are disposed so that the longest dimension of the chamber is generally equal to the length of at least one of the collecting portions, and the dimension "d" extends from the lighter phase-collecting portion into said heavier phase-collecting portion whereby phase separation for a liquid volume of 500 $\mu$L can occur for a spin radius of about 2.5 cm, in less than 2 minutes using a centrifuging force no greater than about 30 g's.

In accord with another aspect of the invention, there is provided a two-phase liquid separation device suitable for phase separation by centrifuging, comprising a chamber with a predetermined volume V, the chamber having a heavier phase-collecting portion, and a lighter phase-collecting portion; means permitting liquid introduction into the chamber; and means for removing separated lighter phase out of the chamber including a valve constructed to open at centrifugal forces in excess of those used to separate the lighter phase from the heavier phase. The device is improved in that the device further includes means for opening and maintaining the valve open only in response to a liquid head of pressure.

In accordance with yet another aspect of the invention, there is provided a valve comprising a valve seat, a closure member, and biasing means for biasing the closure member against the valve seat in opposition to fluid flow through the valve, the biasing means comprising a cellular foam having a Young's modulus of no larger than about 345 kilopascals. The valve is improved in that the closure member is selected from an impervious, non-sticking, dimensionally stable material that is sufficiently flexible and thin as to conform to the valve seat.

Accordingly it is an advantageous feature of the invention that a phase separation device and method are provided that give separations of phases such as in whole blood, at drastically reduced centrifugal forces that still require about the same centrifuging times as conventional devices using forces that are hundreds of g's greater.

It is a related advantageous feature of this invention that phase separation by centrifugation can be done under low force conditions that allow the recovery of lymphocytes from the cell fraction that is normally lost.

It is another advantageous feature of the invention that such a device and phase separation are provided with valving means that draw off the desired phase while centrifuging is still occurring, only in response to the pressure generated by the liquid to be drawn off.

Yet another advantageous feature of the invention is the provision of a valve useful in such a device that is small and relatively inexpensive.

Other advantageous features will become apparent upon reference to the Description of the Preferred Embodiments, when read in light of the attached drawings.

BRIEF DESCRIPTION OF THE DRAWINGS

FIGS. 15 and 16 illustrate the liquid configurations after phase separation and then transfer of serum past the valve, respectively.

DESCRIPTION OF THE PREFERRED EMBODIMENTS

The invention is hereinafter described in light of its use in preferred embodiments, wherein blood serum or plasma is the lighter phase of a two-phase liquid, and particularly preferred chambers are described for collecting the serum and/or lymphocytes valved off from the two separated phases, using a ball check valve. In addition, the invention is useful regardless of the multiple-phase liquid it is used with, regardless of the type or even presence of a subsequent chamber downstream of the valve, and regardless of the valve construction; so long as the valve that is used meets the requirements of the invention.

Figure 1:
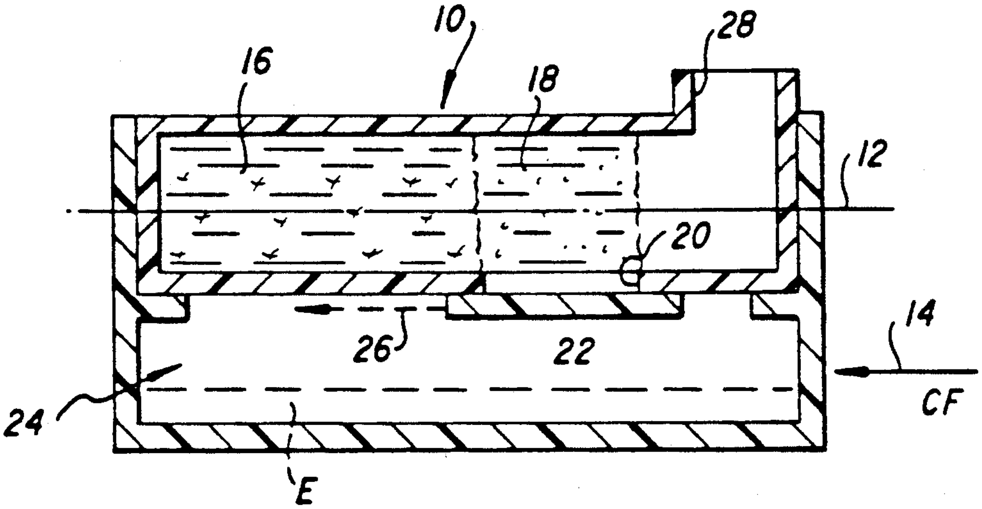
FIG. 1 (PRIOR ART)
FIG. 1 is an elevational view in section of a serum separation device constructed in accord with the prior art.

Many serum separators of the prior art have conventionally used a container 10, FIG. 1, in which the longitudinal axis 12 of the container is parallel to the direction of centrifugal force CF, arrow 14. As a result, substantial time and force is required to separate the heavier blood cells 16 from the lighter serum 18, into the two fractions shown. In some designs, such as in the Japanese application noted above, a pour-off aperture 20 is provided along with a valve 22, to allow just the serum to flow into a separate-like chamber 24 where it can contact a slide-like test element E, shown in phantom. Valve 22 is constructed to open, arrow 26, only when a centrifugal force greater than the CF used to separate the two phases, is achieved, the valve moving in that event against a return spring, not shown. This construction has all the attendant disadvantages noted above. In addition, whole blood is added through aperture 28 in a pouring step, that requires operator attention or an intermediate machine step after whole blood is collected in a separate operation via a needle.

Figure 2B:
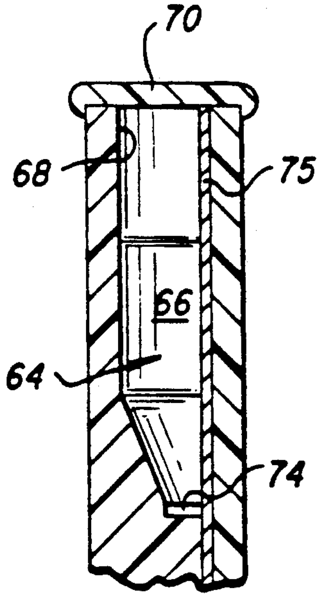
FIG. 2B is a section view taken generally along the line IIB—IIB of FIG. 2A.
Figure 2A:
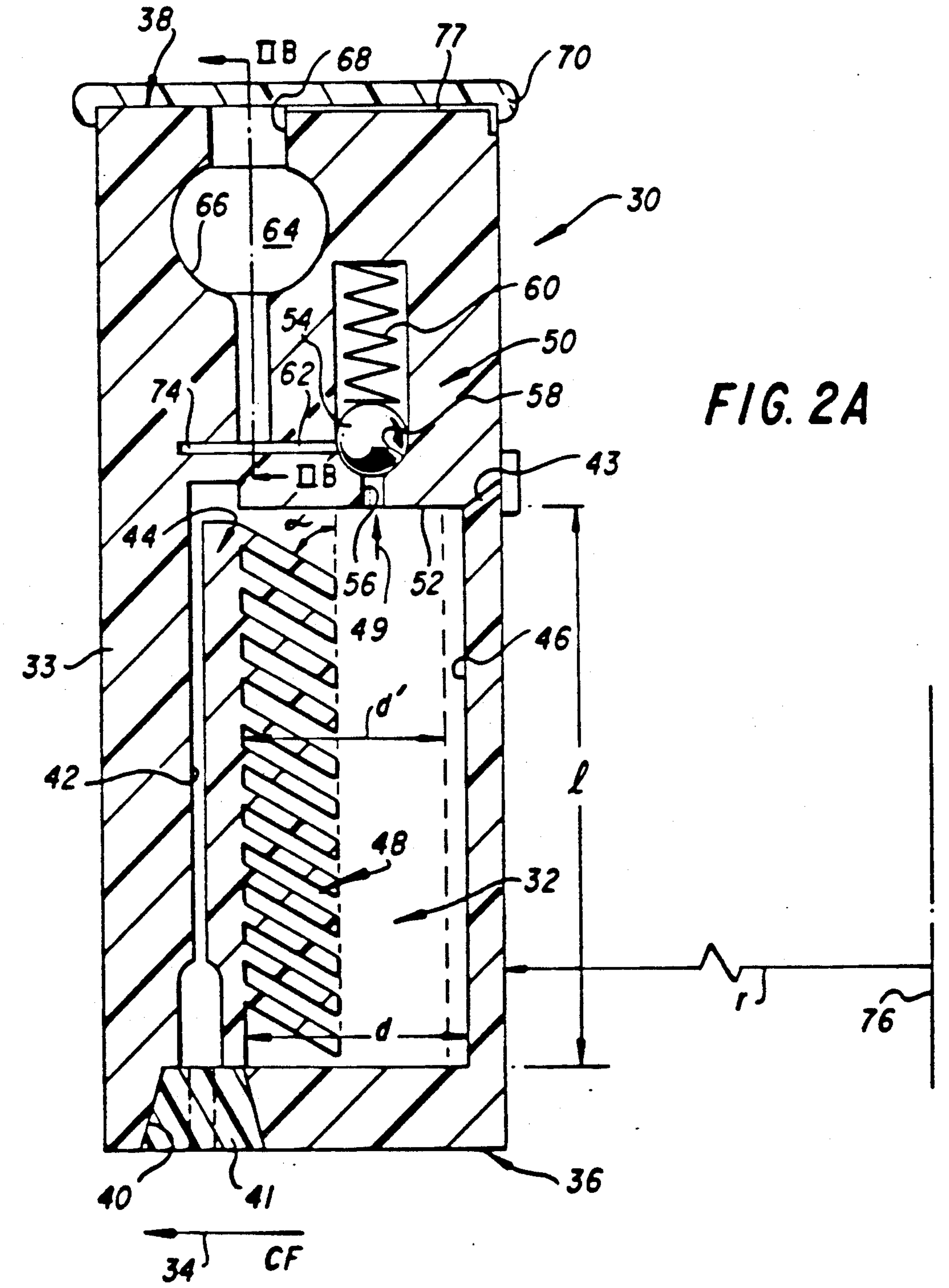
FIG. 2A is an elevational view in section of a serum separation device constructed in accord with this invention.

In accord with the invention, a phase separation device 30, FIG. 2A, for phase separation of at least 2 phases is constructed with a chamber 32 for phase separation that has its long dimension l oriented perpendicular, not parallel, to the direction of centrifugal force CF, arrow 34, and with a specially constructed valve 50. Chamber 32 is defined by a body member 33 having a blood intake end 36 and an opposite, serum-removal end 38. Chamber 32 extends from end 36 to delivery passageway 56. End 36 has an intake aperture 40 filled with a conventional septum 41, chamber 32 being either vented at 43 or evacuated due to attachment at 43 to an external vacuum source, to assist in blood intake. Aperture 40 allows entrance of whole blood via passageway 42 to chamber 32. The width "d" of chamber 32 is one of the shorter dimensions, enough blood being drawn in to fill to about the depth d'. Sidewall 44 of chamber 32 is the sidewall against which the heavier blood cells collect, whereas opposite sidewall 46 is adjacent the lighter serum fraction, during centrifugation. Thus, dimensions d and d' extend from the lighter phase into the heavier phase.

Optionally, fixed porous mechanical means, such as baffles 48, can be positioned along wall 44 so as to be disposed in the blood cells. As described in commonly owned U.S. application Ser. No. 325,725 filed on Mar. 20, 1989 entitled, "Phase Separation Container with Fixed Means Preventing Remixing", such means act to retain the heavier phase from remixing when the lighter, serum phase is drawn off. The plates of the baffles are inclined at an angle alpha that resists remixing forces when flow occurs out of chamber 32 in the direction of arrow 49. Preferably, this angle is a value that is between about 30° and about 120°, most preferably about 60°. Preferably, the distance between the individual plates of baffles 48 is between about 0.018 cm and about 0.10 cm, most preferably about 0.025 cm. The thickness of each plate is not critical, so long as a significant number of such plates are present as will create the needed volume between them to collect the blood cells.

In accord with one aspect of the invention, valve 50 is disposed at an end 52 of chamber 32 intermediate ends 36 and 38, positioned to draw off separated, or plasma serum and lymphocytes (discussed hereinafter). Most importantly, valve 50 is constructed to open only in response to a hydraulic head of force, and not to the effects of force CF, regardless of the magnitude of the latter. To this end, valve 50 is preferably a ball check valve with a ball 54 positioned downstream of passageway 56 at chamber end 52. Ball 54 seats against a hemispherical seat 58, and is biased by a spring 60 aligned to act in a direction that is generally perpendicular to the direction of force CF. This alignment tends to ensure that ball 54 will act against spring 60 only in response to forces other than force CF.

A serum or plasma exit passageway 62 is constructed adjacent seat 58, to carry off the liquid when valve 50 opens. Passageway 62 joins a chamber or compartment 64 sized to receive substantially all the liquid that exits chamber 32 via valve 50. Chamber 64 has a deep well portion 66 designed to collect lymphocytes, and a large opening 68 adapted to allow a pipette access to chamber 64 generally and to well portion 66 in particular. A cover 70 is removably sealed over opening 68 except when access of the pipette or other removal means is desired.

Passageway 62 preferably extends beyond chamber 64 to a trap 74. The function of the trap is to collect the few red blood cells that will gather prior to and during centrifuging, in passageway 56, allowing only desired serum, or plasma and lymphocytes, to pass into chamber 64.

A vent passageway 77 is preferably provided under seal 70 to vent entrapped air as serum is transferred into chamber 64.

Device 30 can be assembled as two plates, FIG. 2B, using a foil layer 75 to achieve a seal that will allow a vacuum to be drawn using vent 43, as described above.

Such a device 30 can be spun in any convenient centrifuge, not shown, where the long dimension l is generally parallel to the spin axis 76. Preferred spin radii are about 2.5 cm, although a wide variety can be used.

Figure 3:
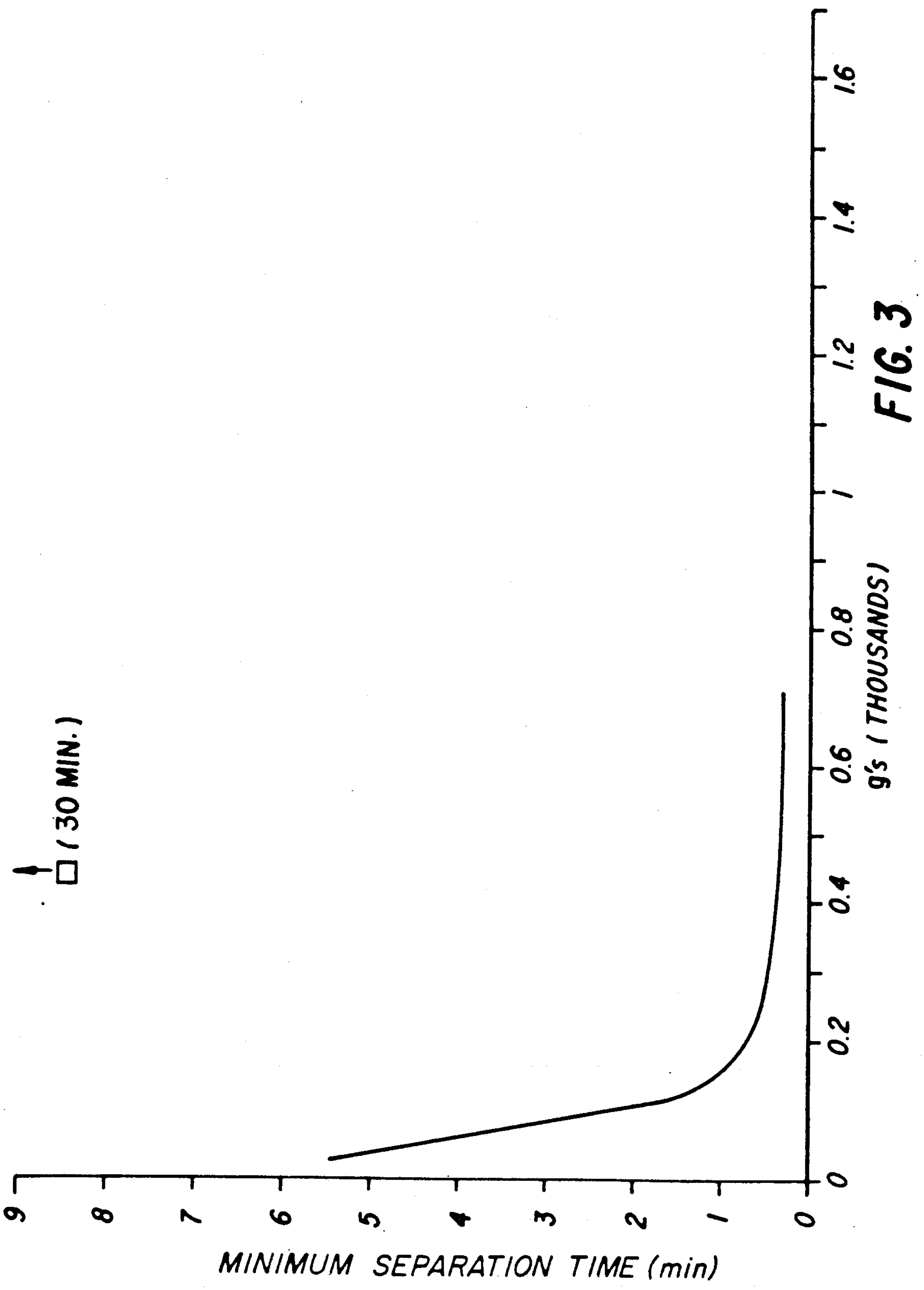
FIG. 3 is a plot of serum separation time vs. centrifugal force, as practiced by the device of this invention.

The method of phase separating, using device 30, will be readily apparent from the preceding discussion. Whole blood is placed into chamber 32 by, e.g., a needle that penetrates septum 41. Device 30 is then spun about axis 76. However, in accord with another aspect of the invention, the speed of rotation that is selected is slow—a speed producing no greater than 400 g's centrifugal force, and most preferably no greater than 30 g's. The reason is that device 30 is capable of achieving phase separation at such forces, using 2 mL of liquid, in less than 2 minutes, and in some cases less than 1 minute, due to the (relatively) short distance (about d'/2) that the blood cells have to traverse to be separated. FIG. 3 illustrates the separation times achievable with the invention, using a 2.5 cm spin radius and a total whole blood volume of 500 μL. As indicated, the serum, or plasma and lymphocytes, is separated in less than 1 minute if the centrifugal force is about 150 g's or greater, there being little separation time enhancement occurring at forces above 400 g's. At the other end, a separation force of only 30 g's will produce complete phase separation in less than 8 minutes, for example, 5.5 minutes. As a comparative example, as described in U.S. Pat. No. 4,818,418 the conditions achieved using a conventional Ficol-Pague/Percoll as an additive are also indicated—a force of 400 g's is effective to achieve separation only after 30 minutes; point FP on FIG. 3.

Whatever centrifugal force that is selected, after serum or plasma separation occurs the lighter phase is then drawn off the stacked liquid in chamber 32, by opening valve 50. This occurs as follows: spring 60 has a spring constant $K_1$ that is pre-selected to resist movement of ball 54 until a certain head of pressure builds up against ball 54. The increased head of pressure occurs by increasing the centrifugal force a factor, for example 50%, above the force used to achieve phase separation. Preferably, the speed of rotation is increased a corresponding amount. Since the serum and blood cells are relatively incompressible against wall 44, the increase in centrifugal force CF translates into an increased force in the direction of arrow 49, which overcomes spring constant $K_1$ of spring 60, and the valve opens. However, this is true only as long as enough serum or plasma remains in chamber 32 to push out passageway 56. When most of the serum or plasma has passed through the valve, the head of pressure occurring even at the increased speed of rotation, drops. As a result, valve 50 closes automatically even at the higher speeds of rotation, unlike the operation of valve 22 in FIG. 1.

Figure 4:
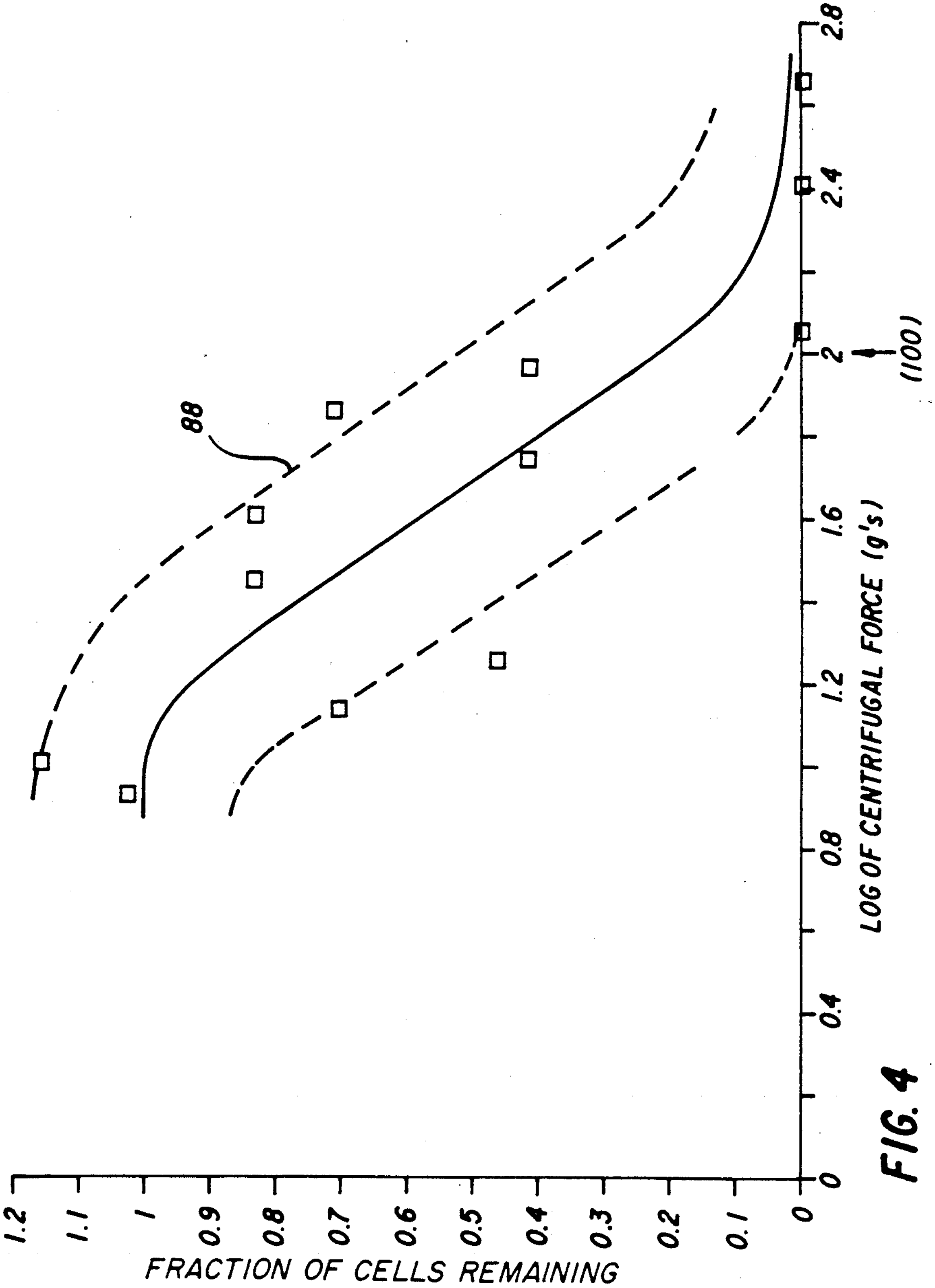
FIG. 4 is a graph of recovered lymphocytes versus the centrifugal force used for phase separation.

FIG. 4 illustrates that in fact this process does produce the separation of lymphocytes, without the necessity of using a chemical phase separation agent common in conventional lymphocyte separation by centrifuging. (If lymphocytes are the desired end-product, then plasma is the lighter phase, rather than serum. Serum is the same as plasma, except that in serum the fibrinogen has been removed, a step considered detrimental to obtaining lymphocytes.) That is, because the centrifugal forces are at a level below about 100 g's, the lymphocytes do not get irretrievably compacted into the buffy coat, as is the case in prior centrifuges that operate at forces above 100 g's.

More specifically, the graph of FIG. 4 was prepared using a device of the type shown in FIG. 2A, in a centrifuge rotor where "r" has the value 2.54 cm (1 inch). Since lymphocytes can all be lost in the red cells if the spin time is allowed to proceed too long before opening valve 50, it is necessary that the process be sampled at varying times for any given centrifugal force $G_i$. Thus, for, e.g., CF=50 g's, many spin times (between 1 and 10 minutes) were examined to determine what optimal time for that CF produces the maximum amount of lymphocytes remaining in the plasma. This is the same as the amount transferred by opening valve 50 by increasing the force CF. The amount of the lymphocytes so remaining in the lighter phase at those optimized times, for each different g force, as a fraction of the total original amount of lymphocytes, was then plotted versus the g forces, expressed as a log to the base 10. FIG. 4 is the result, where a band 88 surrounding the curve has been drawn to "fit" the data. This band symbolizes the uncertainty in the data, where each data point is the mean for the tests. No standard deviation has been determined, however. As noted, the important feature is the recovery of significant fractions of the lymphocytes available. This occurred where the centrifugal force was less than 100 g's.

Figure 5:
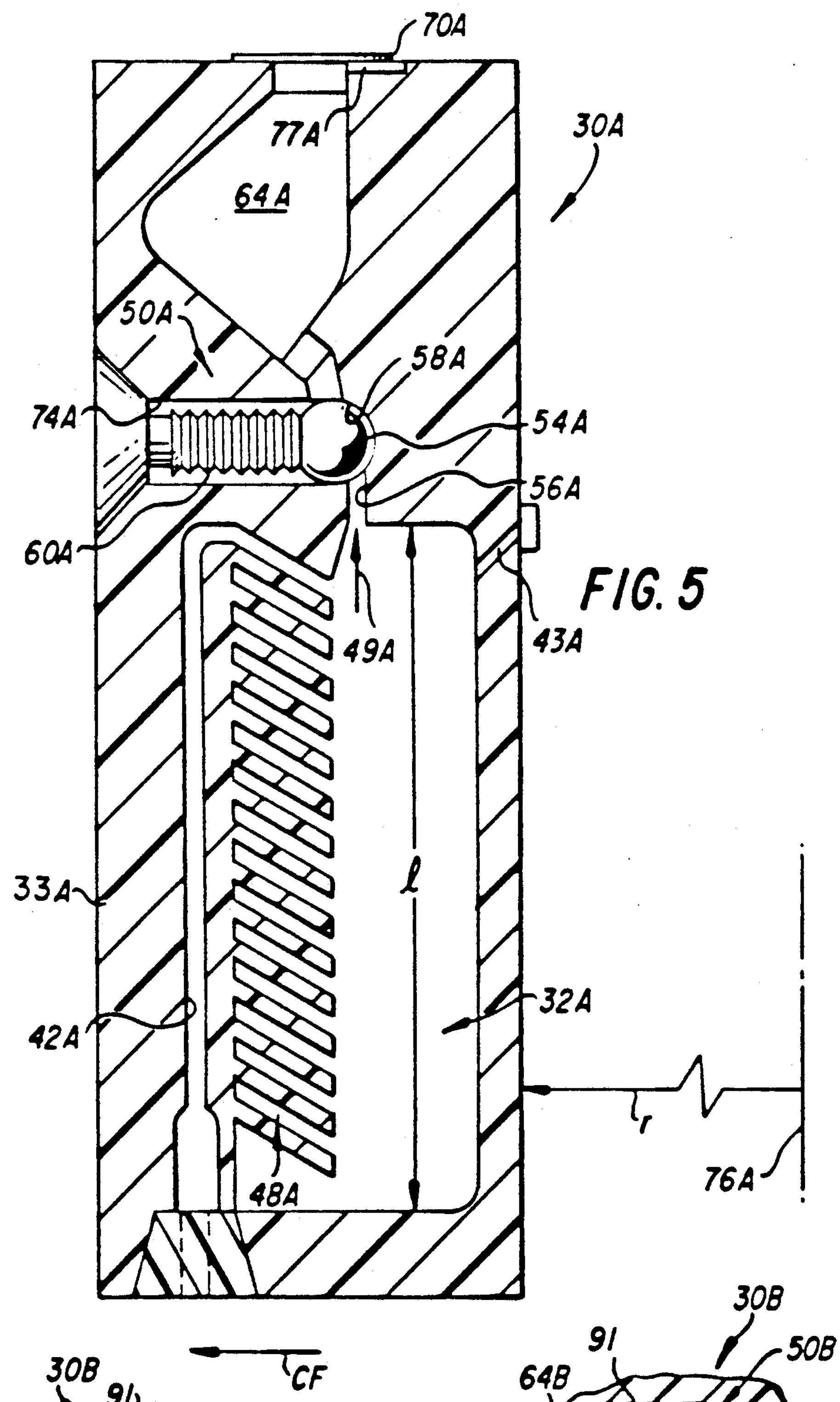
FIG. 5 is an elevational view similar to that of FIG. 2, but of an alternate embodiment.

It is not essential that the valve operate on an axis that is neutral to the centrifugal force, as is shown in the alternate embodiment of FIG. 5. Parts similar to those previously described bear the same reference numeral, to which the distinguishing suffix A has been appended.

Thus, device 30A comprises a body 34A having a chamber 32A, passageway 42A supplying blood thereto as before. Baffles 48A can be included to retain the heavier blood cells, and passageway 56A allows removal of the lighter phases such as lymphocytes and plasma, into covered chamber 64A, from chamber 32A, using valve 50A. The long dimension l of chamber 32A is parallel to spin axis 76A. However, in this embodiment spring 60A is oriented to be parallel to the direction of centrifugal force CF. Nevertheless, the spring constant $K_2$ of spring 60A is selected so that ball 54A still opens only in response to a liquid head of pressure, and not in response to the centrifugal force. When ball 54A lifts off seat 58A, the lighter phases pour into chamber 64A. In this embodiment, the volume of passageway 74A that is not filled by spring 60A is just enough to trap any blood cells caught in passageway 56A prior to phase separation.

The careful selection of spring constant $K_2$ of spring 60A is as follows: It is selected so that valve 50A will not open at the first centrifugal speed $CF_1$ used to achieve phase separation. Moreover, it is strong enough to prevent valve opening even in the presence of the higher centrifugal speed $CF_2$ used to create a head of pressure on the valve, in the absence of any liquid pressing on ball 54A. However, because ball 54A has a surface that is included at a non-90° angle to the force of arrow 49A, ball 54A will incur a force parallel to $CF_2$ due to a liquid head of pressure $\Delta P$ generated in the direction of arrow 49A, caused by centrifugal force $CF_2$. (The component of $\Delta P$ that is parallel to $CF_2$ is hereinafter designated $\Delta P_{CF}$.) That is, spring constant $K_2$ is greater than the force generated by $CF_2$ alone, but less than $(CF_2+\Delta P_{CF})$. When all of the lighter phase liquid has transferred to chamber 64A, there no longer is a liquid head of pressure creating a force $\Delta P_{CF}$, and valve 50A closes automatically, even in the face of a centrifugal force $CF_2$.

The contents of chamber 64A, such as lymphocytes and plasma, are then aspirated out, by removing cover 70A.

Figure 6A:
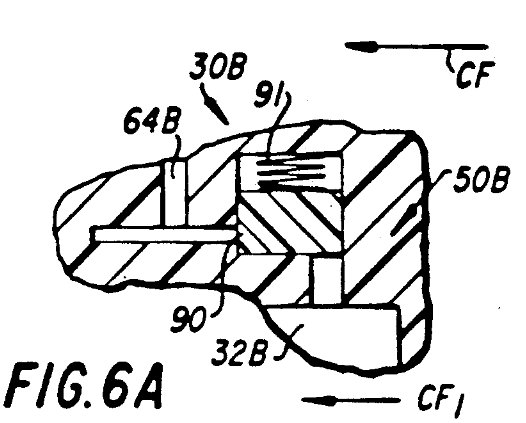
FIGS. 6A and 6B are fragmentary sectional views similar to portions of FIG. 5, but illustrating an alternate embodiment in two positions of use.
Figure 6B:
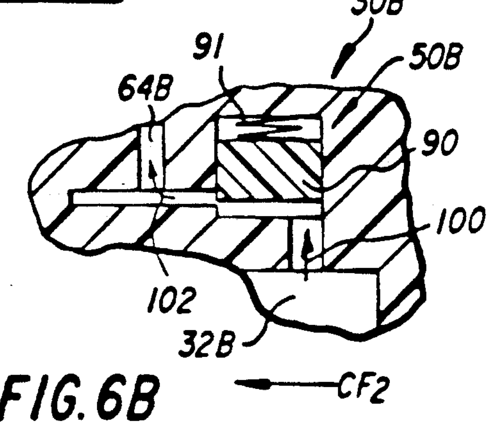

The valve for automatic removal of the lighter phase need not be a ball valve, to respond only to the liquid head of pressure. Any valve can be used, if it is constructed to resist forces other than this head of pressure. Another type is shown in FIG. 6, in which parts similar to those previously described bear the same reference numeral, to which the distinguishing suffix "B" is appended.

Thus, device 30B includes blood collection and separation chambers such as chamber 32B, and a valve 50B that operates only in response to a head of liquid pressure to pass the lighter phase into separate chamber 64B, as in the previous embodiments. However, whereas the previous valves used balls, valve 50B comprises a solid rectangular block 90 backed by a spring 91 of a suitable spring constant selected to deform enough to open the valve, only when centrifugal force is increased from $CF_1$, FIG. 6A, to $CF_2$, FIG. 6B. Flow then proceeds via arrows 100, 102.

The above embodiments are all directed at a device of the invention constructed for use with a phlebotomy syringe. In addition, the device of the invention can be used to collect and process blood from a finger prick, using capillary attraction forces to draw in the blood, FIGS. 7-16. Parts similar to those previously described bear the same reference numeral, to which the distinguishing suffix "C" is appended.

Device 30C is substantially the same as the previous embodiments, from the valve 50C downstream to the serum chamber 64C. Upstream, however, FIG. 7, it is constructed at portion 200 with at least one capillary chamber 218 having opposing walls 212 and 214, FIG. 8, that are spaced apart a capillary distance "d" to cause capillary attraction to draw in liquid. An inlet aperture 40C allows pooled blood, e.g., from a finger prick, to access chamber 218. Thus, portion 200 is similar to the finger prick, capillary attraction collection and separation device taught in U.S. Pat. No. 4,136,036. Once whole blood fills chamber 218, the device can be spun about an exterior axis to generate a centrifugal force CF, arrow 34C, FIG. 7, to achieve serum and cell separation in chamber 218, so that serum can then be transferred past valve 50C and into serum chamber 64C exactly as is described for previous embodiments.

Because capillary spacing "d" does not provide for much overall collected volume, it is preferred that more than one capillary collection chamber be present. Accordingly, at least a second chamber 228, and optionally even a third (not shown) is disposed adjacent chamber 218, FIG. 8. Both chambers have a proximal end 230, FIGS. 7 and 8, and a distal end 232. In each case, end 230 is fluidly connected to inlet aperture 40C, while end 232 is fluidly connected via perpendicular passageway 234 to transfer passageway 56C, FIG. 9. Thus, chambers 218 and 228 are disposed to act in parallel, to simultaneously collect by capillary attraction, whole blood touched to inlet aperture 40C.

Figure 7:
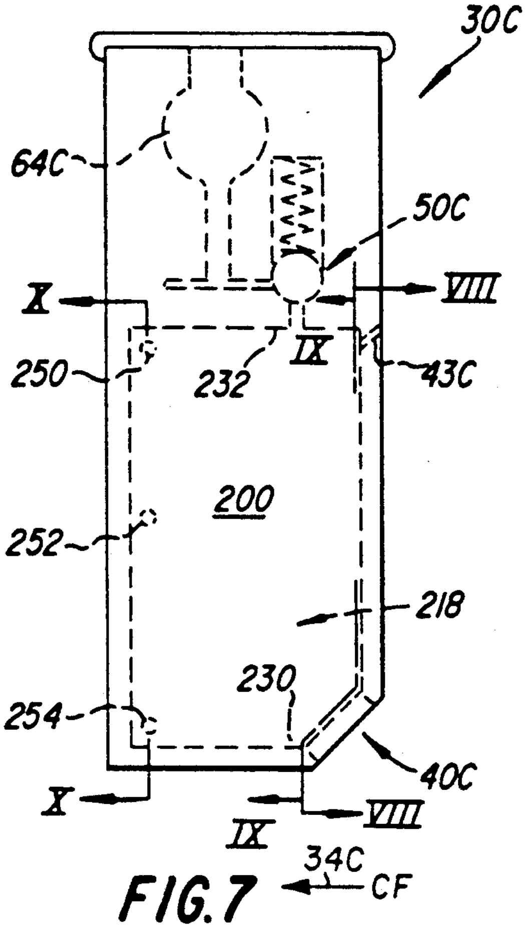
FIG. 7 is an elevational view of yet another alternate embodiment of the invention, used for finger pricks.
Figure 8:
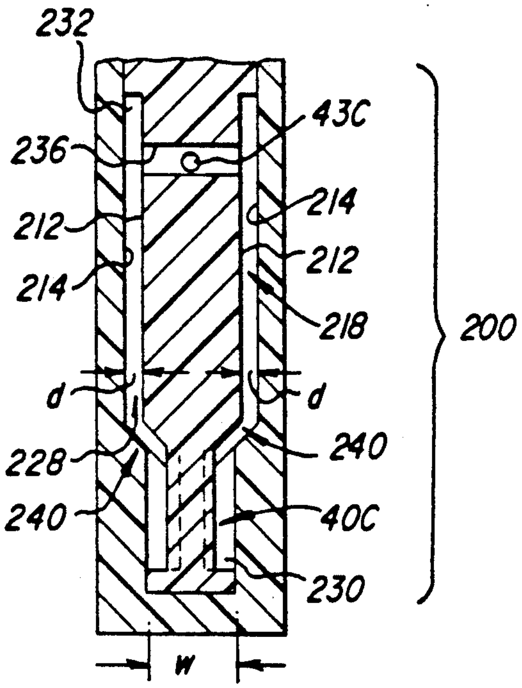
FIGS. 8–10 are fragmentary section views taken generally along the lines VIII—VIII, IX—IX, and X—X, respectively, of FIG. 7.

An air vent 43C is provided, FIGS. 7 and 8, as in the previous embodiment, to vent entrapped air. Each chamber is directly connected to vent 43C by a perpendicular passage 236, FIG. 8, disposed immediately adjacent vent 43C.

Figure 9:
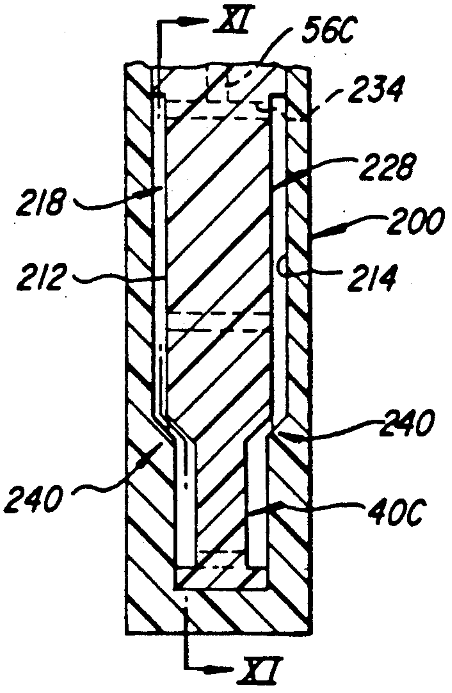

To bring the chambers closer together at aperture 40C, in light of the small volumes and dimensions characteristic of a finger prick, major walls 212 and 214 of each chamber preferably are beveled at 240, FIGS. 8 and 9, adjacent to aperture 40C, towards the other chamber, minimizing the width "w", FIG. 8, that is required.

Figure 10:
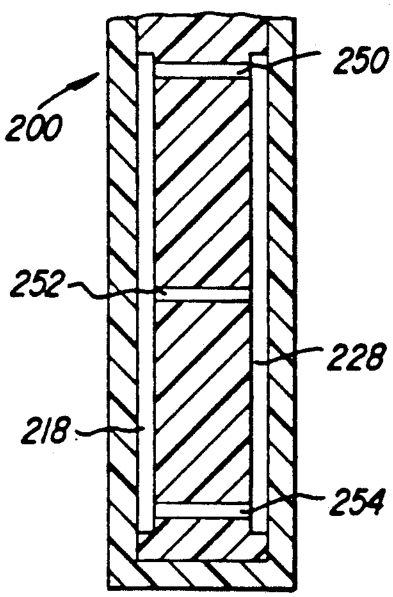
Figure 11:
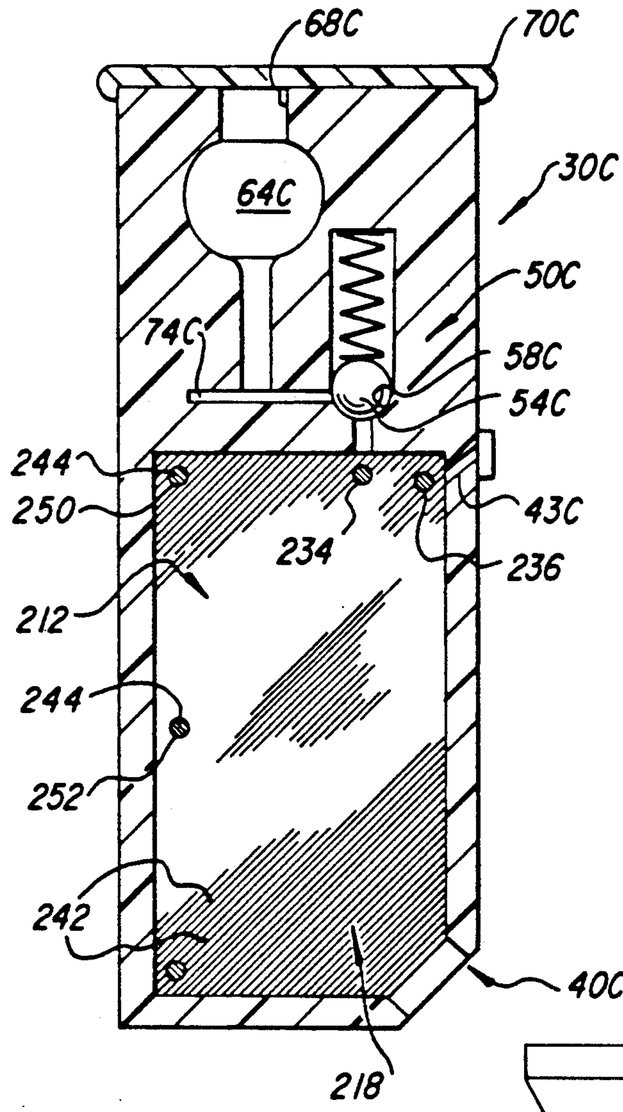
FIG. 11 is an elevational view in section of the entire device of FIG. 7, taken generally along the line XI—XI of FIG. 9.

To equalize the liquid volumes that might build up in one of the two parallel chambers due to the other filling faster, passageways 250, 252 and 254 are provided, FIGS. 7 and 10, to fluidly connect together all of the chambers of portion 200. These passageways are preferably disposed in between proximal end 230 and distal end 232.

The surfaces of walls 212 and 214 can be nominally smooth. Preferably, however, they are provided with grooves 242 on wall 212 and 244 on wall 214, FIGS. 11 and 12. The grooves are also preferably positioned and formed so that grooves 242 are disposed at an angle alpha to grooves 244, FIG. 12. The purpose is to provide control of the waveform of the advancing menisci 260, 264, as is explained in U.S. Pat. No. 4,233,029. The details of the groove construction are set forth in that '029 patent. Thus, menisci 260 and 264 will advance, arrows 262 and 266, with the shape of the grooves, which for linear grooves as shown will produce a trapezoidal waveform that will be rectangular if angle alpha is 90°. This control of the waveform further ensures that there will be no entrapped air bubbles and that chambers 218 and 228 will completely fill with whole blood. Further, hysteresis caused by the grooves ensures that the intake of whole blood from a wound can be interrupted without the trailing meniscus advancing so far into aperture 40C that an air bubble is formed when intake is resumed.

Figure 12:
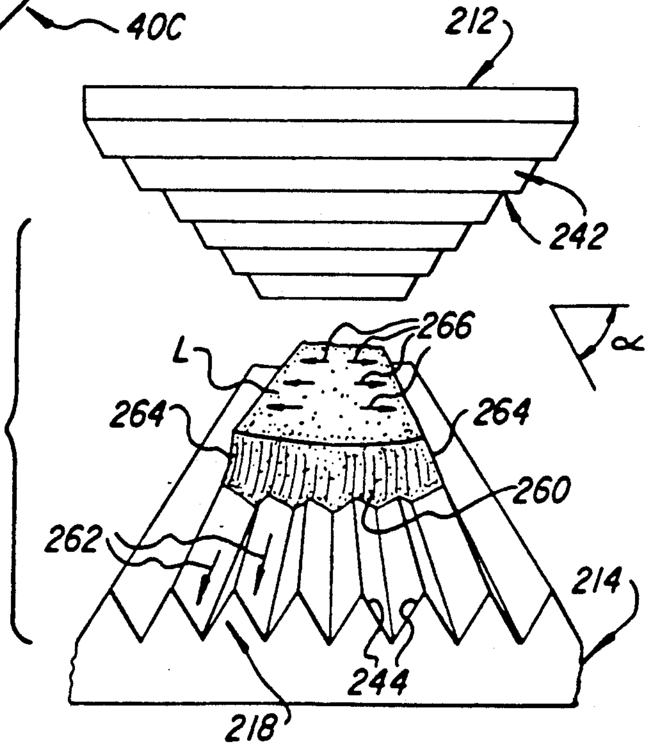
FIG. 12 is an enlarged, fragmentary, partially schematic perspective view of the capillary zone in each of the chambers shown in FIG. 9.
Figure 13:
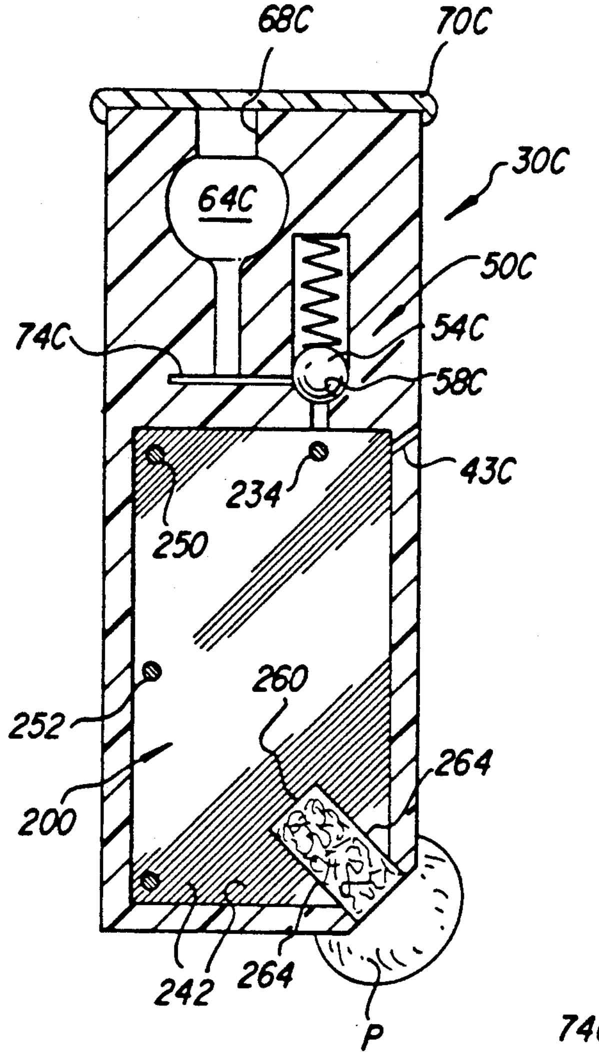
FIGS. 13 and 14 are section views similar to that of FIG. 11, illustrating the fill sequence of the device.
Figure 14:
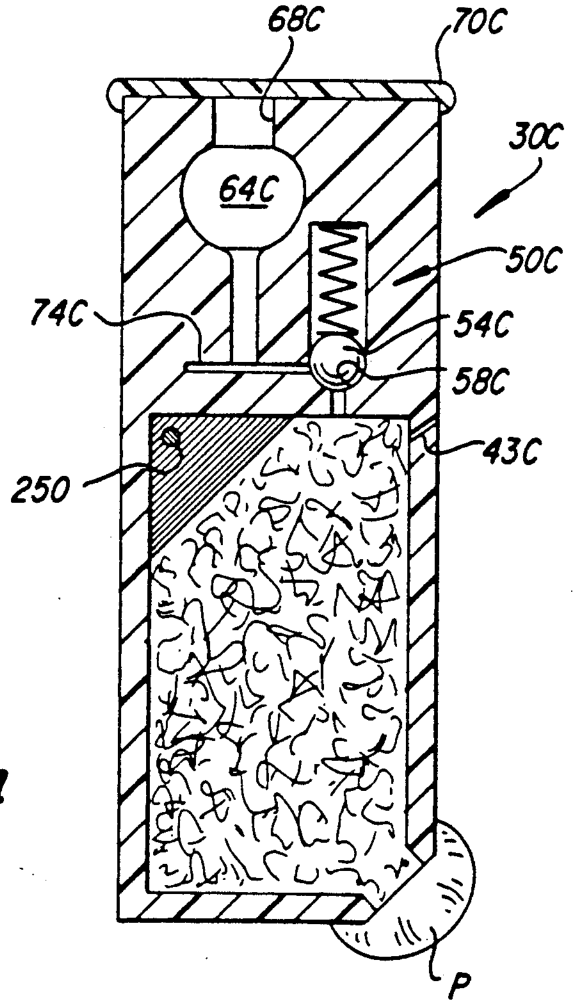

Although only one opposing wall grooves 242 are visible in FIG. 12, grooves 244 of the other opposing wall for the chamber 228 can be seen through passageways 250, 252, 254 and connecting passageway 234.

The operation of device 30C will be readily apparent from the preceding. Briefly, FIGS. 13-16, when the device is touched to a pool P of blood, FIG. 13, the whole blood advances at portion 200 to simultaneously fill both chambers 218 (and 228, not shown), with menisci waveforms 260 and 264 dictated by the linearity or other shape of grooves 242 (and 244, not shown). The advance continues, FIG. 14, with passageway 250 being the last to contact the blood. Once chambers 218 and 228 are filled, aperture 40C is capped by any suitable cover 300, FIG. 15, and the device is spun to about 400 g's, to separate the blood into its two phases. The circles of phase 302 indicate blood cells, whereas the dots of phase 304 indicate serum. Thereafter, force CF is increased to cause hydrostatic pressure of the serum against valve 50C, and transfer of serum occurs into chamber 64C via passageway 56C. After centrifuging, the serum can be easily removed from chamber 64C by penetrating seal 70C with a pipette 310, FIG. 16. The pipette is inserted, arrow 312, and the serum withdrawn, arrow 314. (Aperture 68C is sized to allow access of the pipette).

Still another use that can be made of chamber 64 (not shown) is as one of the twin receptacles used to fill a dual pipette. That is, the twin receptacles or tubs conventionally used for filling a dual pipette, comprise one in which a reference liquid is pre-inserted (or subsequently added) while the other one is chamber 64 into which serum is transferred when the valve is opened.

Figure 17:
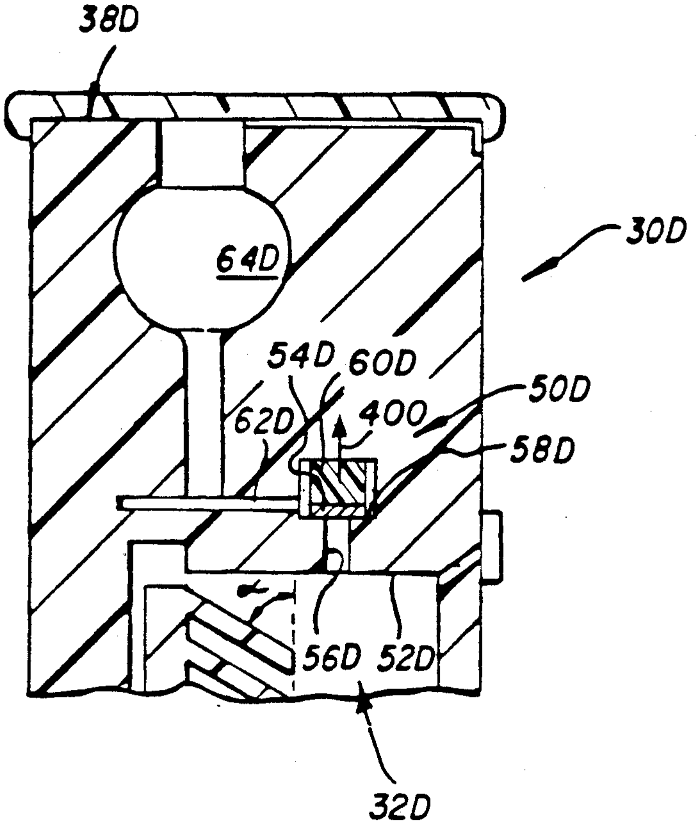
FIGS. 17 and 18 are fragmentary elevational views similar to FIGS. 2 and 5, respectively, but illustrating an alternate embodiment of the valve.
Figure 18:
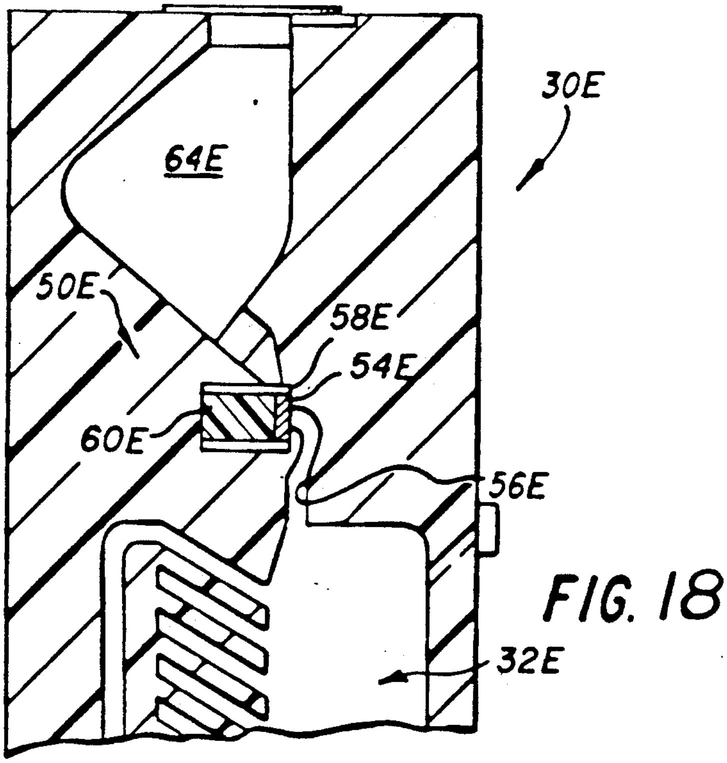

The valve between the two chambers need not be a ball and spring, and indeed, a smaller, less expensive valve can be constructed using the embodiment shown in FIGS. 17-18. Parts similar to those previously described bear the same reference numeral, to which the distinguishing suffix D or E has been appended, respectively.

Thus, FIG. 17, the device 30D has chambers 32D and 64D connected by passageway 56D and 62D, to function exactly as described above for the embodiment of FIG. 2A. However, valve 50D comprises a biasing member 60D and a closure member 54D that seats against valve seat 58D, wherein members 60D and 54D are selected from materials different than those illustrated heretofore.

More specifically, the biasing member is preferably a cellular foam having a Young's modulus of no larger than about 345 kilopascals, so as to be readily compressed using the forces described above. In addition, however, it should most preferably permit the valve to open as required under compressions (arrow 400) that are no greater than 40%, to avoid buckling the valve.

Most preferably, such foam is an open-celled foam, of which polyurethane foam is a highly preferred example, albeit foams of other polymers that are inert to blood, or whatever fluid is being transferred, can be used.

A specific example of such polyurethane foam that has been shown to be effective is such foam available under the tradename "Poron", from Rogers Corporation. Of the "Poron" products, "Poron 4701-01" is particularly useful. This material has the following typical range of physical properties, as shown by the Rogers Corp. Physics Properties Data Sheet dated 1989:

| Property | Test Method | Range | |
|---|---|---|---|
| Density +/− 10% (kg/m3) | ASTM 3574 | 240 | 320 |
| Color (Code) | | Black | Black |
| Compression Set | ASTM 1667 @ 73° F. (23° C.) | <2% | <2% |
| | ASTM 3574 | <10% | <10% |
| | @ 158° F. (70° C.) | <10% | <10% |

-continued

| Property | Test Method | Range | |
|---|---|---|---|
| | ASTM 3574 after 5 hours @ 250° F. (121° C.) | <5% | <5% |
| Compression Force Deflection (Young's Modulus) (kPa) | 0.2"/min Strain Rate Force measured @ 25% Deflection | 42 ± 14 | 69 ± 21 |
| Durometer | Shore "0" | 12 | 17 |
| Tensile Strength min. (kPa) | @ 20"/min Strain Rate | 275 | 620 |
| Elongation % min | @ 51 cm per min | 100 | 100 |
| Temperature Resistance | | | |
| Recommended Constant Use | | 70° C. | 70° C. |
| Intermittent | | 121° C. | 121° C. |
| Cold Flexibility | MIL-P-12420C @ −40° C. | Pass | Pass |
| Embrittlement Temperature | ASTM D746 | −40° C. | −40° C. |
| Flame Spread | MVS S302 | Pass | Pass |
| Thickness min. (mm) | | 3.2 | 3.2 |
| Outgassing % Total Mass Loss | ASTM E-595 | 1.30 | 1.30 |
| Thickness | | | |
| Tolerance Capabilities (mm) | | ±10% 2.5-12.7 | ±10% 1.6-12.7 |
| Thermal Conductivity BTU/(HrFt2)/(°F./in) | "K" Factor | 0.5 | 0.5 |
| Coefficient of Thermal Expansion | | 1.3-1.8 × $10^{-4}$/°C. | |
| Corrosion Resistance | AMS 3568 | Excellent | |

Regarding closure member 54D, it is an impervious material which by its flexible nature and thickness must be such as will conform to and seal against valve seat 58D, without sticking, when it is biased into contact with the seat. As used herein, "conform" means, to generally follow the shape and configuration of that seat, which here is shown as being a generally flat surface. However, other surfaces also can be used. Also as used herein, "without sticking" means, without adherence of the closure member on the valve seat at the time of use such as will significantly increase, i.e., by more than 5%, the force required to displace the closure member from the seat, compared to the force required at the time of assembly of the valve in the device. Such sticking is particularly evident with many forms of rubber, after several weeks of storage of the device prior to use, especially if stored at elevated temperatures.

In addition, the material of the closure member preferably is also dimensionally stable, that is, a material that is relatively resistant to cold flow.

Most preferably, the materials found to provide such non-sticking, imperviousness, flexibility and conformability, are either a preferred polymer tape; or a metallized polymer tape such as one of the preferred polymer tapes that is metallized with silver metal. The skinning over of the foam that forms biasing member 60D, and most rubbers, have not been found to be acceptable. Materials useful for forming the polymer tapes of closure member 54D include polyolefins and as polyethylene and polypropylene and copolymers, including block copolymers of the same monomers and other modified polyolefins available from duPont, Dow Chemical Co., and others, for example, under the tradename "Handi-Wrap II". Certain preferred sheet film materials are the halogenated olefin polymers such as polyvinylidene chloride copolymers, for example, poly(vinyl chloride-co-vinylidene chloride) and poly(acrylonitrile-co-vinylidene chloride) (the Saran ® resins sold by Dow Chemical Co.), poly(vinyl chloride) (PVC), and poly(tetrafluoroethylene), e.g., Teflon sold by duPont and copolymers thereof, e.g., poly(hexafluoropropylene-co-tetrafluoroethylene). Acrylic polymer sheet materials are also useful such as poly(methyl methacrylate), poly(methyl acrylate), poly(ethyl methacrylate) and other homo- and copolymers of inert acrylic esters, for example, the Elvacite acrylic resins sold by duPont. A preferred class of materials is the celluloses typically employed as film support materials for photographic, electrophotographic, magnetic tape, and transparent adhesive tape coatings such as cellulose acetate, cellulose triacetate, cellulose acetate butyrate, nitrocellulose, etc. Other preferred polymers include well-known polyesters, polycarbonates and polyamides such as poly(ethylene terephthalate) (PET) sold under the tradename Mylar by duPont and Estar by Eastman Kodak Company, bisphenol A polycarbonates such as the Lexan polycarbonates sold by General Electric Co., and nylon sold by duPont.

Especially preferred materials are those supplied with a pressure-sensitive adhesive coating to allow quick, easy application to biasing member 60D. Examples are poly(ethylene terephthalate) and cellulose acetate films, with or without a matte finish, and containing a pressure-sensitive adhesive exemplary such films being Scotch Brand Tapes Numbers 483, 810, and 850, sold by 3M Co.

It is understood that tacky, soft, or sticky materials such as rubbers and ionic or other hydrophilic polymers are to be avoided to prevent sticking of the tapes on storage. Thus, the celluloses, polyesters, and halogenated polyolefins are preferred; however, this problem can be minimized or avoided by application of metal coatings on foils to the tape.

Adhesives useful for bonding the closure members lacking a pre-applied adhesive include the polymer resins, rubber cements and mucilages known in the art, for example, pressure-sensitive adhesives as described in U.S. Pat. Nos. 2,358,761; 2,553,816 and 2,783,166; ethylene-vinyl acetate copolymers (EVA resins) such as HA6164 sold by Borden Chemical Company, and Elvax polymers sold by duPont, and diolefin-styrene block copolymers, i.e., polyisoprene resins such as the Kraton resins sold by Shell Chemical Co. and the Solprene resins sold by Phillips Petroleum Company.

The following polymer tapes were tested and found to be acceptable:

| Material | Available From | Under the Tradename |
|---|---|---|
| (1) modified polyethylene | Dow | "Handi-Wrap II" |
| (2) cellulose acetate | 3M | "Scotch Brand Tape" No. 810 |
| (3) cellulose acetate | 3M | "Highland Brand Tape" No. 6200 |
| (4) polyethylene | 3M | Scotch Brand Tape" No. 483 |
| (5) polyester | 3M | "Scotch Brand Tape" No. 850 |
| (6) Polytetrafluoroethylene | 3M | PTFE "Teflon" |
| (7) Polycarbonate | General Electric | "Lexan" |

Not all thicknesses of such tapes are sufficiently thin to make them conform as noted. The maximum thicknesses and preferred thicknesses are as follows; for the above-tested tapes:

| Type | Maximum Thickness | Preferred Thickness |
|---|---|---|
| (1) as listed above | 0.15 mm | 0.013 mm |
| (2) as listed above | 0.10 mm | 0.06 mm |
| (3) as listed above | 0.10 mm | 0.06 mm . |
| (4) as listed above | 0.20 mm | 0.13 mm |
| (5) as listed above | 0.15 mm | 0.05 mm |
| (6) polyester silvered on one side | 0.15 mm | 0.08 mm |
| (7) as listed above | 0.15 mm | 0.09 mm |
| (8) as listed above | 0.15 mm | 0.03 mm |

The closure member comprising such a material is readily adhered to biasing member 60D by any suitable adhesive, for example, Similarly, FIG. 18 illustrates a valve operating in response to pressure transmitted parallel to centrifugal forces, in the manner shown for FIG. 5, but using a valve constructed of the materials described for FIG. 17. Thus, device 30D has chambers 32E and 64E, connected by passageway 56E within which valve 50E is located. As in FIG. 17, valve 50E comprises biasing member 60E pressing closure member 54E against valve seat 58E, with members 60E and 54E being constructed as described for FIG. 17.

The valve shown in FIGS. 17 and 18 need not be used only in a two-phase liquid collection and separation device. In addition, it can be used in controlling liquid flow of any type, between any two locations, particularly where the pressure used to initiate transfer is small, e.g., on the order of about 6.8 to 68 kPa [kilopascals]. Thus, for example, the valve can be used where small amounts of biological fluids of any kind are sequentially transferred between chambers, with time delays between transfer either for the purpose of separating cellular components from supernatant which require a fixed time, or to provide adequate time to carry out reactions such as binding of soluble components to solid surfaces before the sample is transferred to another chamber.

The invention has been described in detail with particular reference to preferred embodiments thereof, but it will be understood that variations and modifications can be effected within the spirit and scope of the invention.

What is claimed is:

1. In a liquid phase separation device suitable for phase separation by centrifuging, comprising a chamber with a predetermined volume V, a longest dimension l, and at least one shorter dimension d; said chamber having at least a heavier phase-collecting portion and a lighter phase-collecting portion; means permitting liquid introduction into said chamber; and removing means for removing separated lighter phase out of said chamber after separation without decreasing the centrifugal force used to separate the two-phases;

the improvement wherein said heavier phase-collecting portion and said lighter phase-collecting portion are disposed so that said longest dimension of said chamber is generally equal to the length of at least one of said collecting portions, and said dimension "d" extends from the lighter phase-collecting portion into said heavier phase-collecting portion, and wherein said removing means include valve means for passing said separated lighter phase out of said chamber only in response to a liquid head of pressure created by centrifugal force, whereby phase separation for a liquid volume of 500 μL can occur for a spin radius of about 2.5 cm, in less than 2 minutes using a centrifuging force no greater than about 30 g's.

2. In a two-phase liquid separation device suitable for phase separation by centrifuging, comprising at least one chamber with a predetermined volume V, said chamber having a heavier phase-collecting portion, and a lighter phase-collecting portion; inlet means permitting liquid introduction into said chamber; and means for removing separated lighter phase out of said chamber including a valve constructed to open at centrifugal forces in excess of those used to separate the lighter phase from the heavier phase;

the improvement wherein said device further includes means for opening and maintaining said valve open only in response to a liquid head of pressure created by said excess centrifugal forces.

3. A device as defined in claim 2, wherein said opening and maintaining means is constructed to close said valve in the absence of liquid pressure, regardless of the magnitude of the centrifugal force during centrifuging.

4. A device as defined in claim 3, wherein said valve includes biasing means to bias the valve closed, said biasing means being operative in a direction that is substantially perpendicular to the direction of force of said centrifuging, with a biasing constant adjusted to open said valve in response only to a predetermined liquid head of pressure, so that said valve opens and stays open only as long as a liquid head of pressure is present because liquid is pressing against said valve, even when high centrifugal forces are applied in said perpendicular direction.

5. A device as defined in claim 4, wherein said valve is a ball valve.

6. A device as defined in claim 1 or 2, wherein said valve comprises a valve seat, a closure member, and biasing means for biasing said closure member against said valve seat in opposition to fluid flow through said valve, said biasing means comprising a cellular foam having a Young's modulus of no larger than about 345 kilopascals, said closure member being selected from an impervious, non-sticking, dimensionally stable material that is sufficiently flexible and thin as to conform to said valve seat.

7. A device as defined in claim 6, wherein said material of said closure member comprises a polymer tape no thicker than about 0.2 mm.

8. A device as defined in claim 7, wherein said closure member comprises a polymer tape selected from the following polymers and the following maximum thickness:

| | |
|---|---|
| cellulose acetate | 0.10 mm |
| polyethylene | 0.20 mm |
| polyester | 0.15 mm |
| polyester silvered on one side | 0.15 mm |
| polytetrafluorethylene | 0.15 mm |
| polycarbonate | 0.15 mm. |

9. A device as defined in claim 1, 2 or 3, wherein said liquid is whole blood and said lighter phase is serum or plasma, and further including means for withdrawing and trapping residual blood cells left in said lighter-phase-collecting portion when centrifuging begins.

10. A device as defined in claim 1, 2 or 3, and further including in said chamber means for restricting separated heavier phase from remixing with said separated lighter phase after phase separation.

11. In a two-phase liquid separation device suitable for phase separation by centrifuging, comprising at least one chamber with a predetermined volume V, said chamber having a heavier phase-collecting portion, and a lighter phase-collecting portion; inlet means permitting liquid introduction into said chamber; and means for removing separated lighter phase out of said chamber including a valve constructed to open at centrifugal forces in excess of those used to separate the lighter phase from the heavier phase;

the improvement wherein said device further includes means for opening and maintaining said valve open only in response to a liquid head of pressure and further including a second chamber having a heavier phase-collecting portion and a lighter phase collecting portion, said at least one chamber and said second chamber being disposed adjacent to each other, said chambers having a proximal end and a distal end, said chambers being fluidly connected in common to a) said inlet means at said proximal end and b) said removing means at said distal end, so that said chambers act in parallel.

12. A device as defined in claim 11, wherein said chambers are defined by opposed surfaces spaced apart a capillary distance so that liquid entering said inlet means is drawn into said chambers by capillary attraction.

13. A device as defined in claim 12, wherein said opposed surfaces for each of said chambers are provided with grooves, the grooves of one surface of a chamber being disposed at an angle to the grooves of the other surface of the same chamber.

14. A device as defined in claim 11, and further including between said distal ends and said proximal ends, passageways connecting said chambers together to allow equalizing of pressure between said two chambers, so that said chambers fill together at an approximately equal rate.

* * * * *